United States Patent
Kuchi

(10) Patent No.: US 10,848,360 B1
(45) Date of Patent: Nov. 24, 2020

(54) RECEIVER FOR RECEIVING DISCRETE FOURIER TRANSFORM-SPREAD-OFDM WITH FREQUENCY DOMAIN PRECODING

(71) Applicant: WISIG NETWORKS PRIVATE LIMITED, Hyderabad (IN)

(72) Inventor: Kiran Kumar Kuchi, Hyderabad (IN)

(73) Assignee: WISIG NETWORKS PRIVATE LIMITED

( * ) Notice: Subject to any disclaimer, the term of this patent is extended or adjusted under 35 U.S.C. 154(b) by 0 days.

(21) Appl. No.: 16/509,468

(22) Filed: Jul. 11, 2019

(51) Int. Cl.
*H04L 27/34* (2006.01)
*H04L 27/26* (2006.01)
*H04L 25/03* (2006.01)

(52) U.S. Cl.
CPC ...... *H04L 27/265* (2013.01); *H04L 25/03178* (2013.01); *H04L 25/03968* (2013.01); *H04L 27/2628* (2013.01); *H04L 27/3444* (2013.01); H04L 2025/03414 (2013.01)

(58) Field of Classification Search
CPC ............. H04L 27/265; H04L 25/03968; H04L 25/03178; H04L 27/3444; H04L 27/2628; H04L 2025/03414
See application file for complete search history.

(56) References Cited

U.S. PATENT DOCUMENTS

| | | | | |
|---|---|---|---|---|
| 2005/0068886 | A1* | 3/2005 | Wang | H04L 27/2607 370/210 |
| 2006/0133523 | A1* | 6/2006 | Stojanovic | H04L 25/03343 375/260 |
| 2006/0268923 | A1* | 11/2006 | Wu | H04L 25/0204 370/441 |
| 2007/0009013 | A1* | 1/2007 | Misra | H04B 1/707 375/146 |
| 2008/0159424 | A1* | 7/2008 | Hoo | H04L 1/0631 375/260 |
| 2009/0052517 | A1* | 2/2009 | Chen | H04L 25/03133 375/235 |
| 2009/0058728 | A1* | 3/2009 | Mostafa | H04B 7/0842 342/380 |
| 2014/0029952 | A1* | 1/2014 | Liu | H04B 10/116 398/115 |
| 2016/0211999 | A1* | 7/2016 | Wild | H04L 27/264 |
| 2019/0222456 | A1* | 7/2019 | Zeng | H04L 27/361 |

\* cited by examiner

*Primary Examiner* — Kenneth T Lam

(74) *Attorney, Agent, or Firm* — McAndrews, Held & Malloy, Ltd.

(57) ABSTRACT

Embodiments of the present disclosure are related, in general to communication, but exclusively relate to method and receiver for detecting data in a communication network. The method comprises transforming by a receiver, a received signal in to frequency domain to generate transformed signal. Also, the method comprises equalizing the transformed signal to obtain an estimated precoded signal, which is transformed using inverse Fourier transform to obtain a time domain signal. The time domain signal is de-rotated to produce de-rotated data, on which processing is performed by separating real part and imaginary part associated with the de-rotated signal. The real part and the imaginary parts are filtered and combined to produce a signal, that is demodulated to detect the signal.

16 Claims, 3 Drawing Sheets

RECEIVER FOR RECEIVING DISCRETE FOURIER TRANSFORM-SPREAD-OFDM WITH FREQUENCY DOMAIN PRECODING

CROSS-REFERENCE TO RELATED APPLICATIONS

This application claims priority from Indian Provisional Patent Application Number 201741001483, filed on Jan. 13, 2017 and Indian Provisional Patent Application Number 201741041089 filed on Nov. 16, 2017, the entirety of which are hereby incorporated by reference.

TECHNICAL FIELD

Embodiments of the present disclosure are related, in general to communication, but exclusively relate to receiver for Discrete Fourier Transform-spread-Orthogonal frequency-division multiplexing (DFT-s-OFDM) to mitigate inter-symbol-interference (ISI).

BACKGROUND 5G new radio (NR) supports enhanced mobile broadband (eMBB), ultra-reliable-low-latency-communication (URLLC) and massive-machine-type-communication (mMTC) for frequency bands below 6 GHz and as well as above 6 GHz, including millimeter wave bands (e.g. 20-40 GHz and 60-80 GHz).

Numerous techniques have been developed to reduce OFDM peak to average power ratio (PAPR) and DFT Spread OFDM (DFT-SOFDM) is one outcome of such investigations. With an extra DFT block prior to the conventional OFDM transmitter, it proves to be an effective way of combining the benefits of OFDM with a low PAPR transmission signal. As such it has already been selected as the uplink modulation scheme for the upcoming Long-Term Evolution (LTE) of 3GPP.

The pi/2 BPSK DFT Spread OFDM with precoding is adopted for 5G New Radio (NR) phase-1 as a low PAPR uplink waveform that is expected to increase the link coverage. The waveform behaves like a constant envelope signal and allows power amplifier (PA) operation near the saturation region. The precoder or filter can be implemented in time domain before DFT or after DFT in frequency domain. In phase-1 of NR both reference signal (RS) and data are filtered using the same precoder. The receivers use minimum mean square estimation (MMSE) equalizer which does not know exact filter applied at the transmitter end. Having a filter specified in the standard allows an improved receiver that mitigates the inter-symbol-interference (ISI) introduced by the precoder more effectively. In such a scenario, the precoder is applied to the data but not for the RS. The channel estimator can estimate the propagation channel and reconstruct the overall effective channel impulse response by taking into account the exact precoder knowledge.

SUMMARY

The shortcomings of the prior art are overcome and additional advantages are provided through the provision of method of the present disclosure.

Additional features and advantages are realized through the techniques of the present disclosure. Other embodiments and aspects of the disclosure are described in detail herein and are considered a part of the claimed disclosure.

In an aspect of the present disclosure, a method of detecting data in a communication network is provided. The method comprises transforming by a receiver, a received signal in to frequency domain using a Discrete Fourier Transform (DFT) to generate transformed signal. Also, the method comprises equalizing the transformed signal to obtain estimated precoded signal and performing inverse Fourier transform operation on the estimated precoded signal to obtain time domain signal. Further, the method comprises de-rotating the time domain signal to produce de-rotated data and processing the de-rotated signal by separating real part and imaginary part associated with the de-rotated signal. The real part is filtered using a first filter and the imaginary parts is filtered using a second filter and the filter outputs are combined to produce a signal that is used for demodulation. In an embodiment, where the precoder is a two-tap filter and the first filter are in absent, then the second filter takes the form of a circular shift followed by a scaling factor.

Another aspect of the present disclosure is a receiver to receive data in a communication network. The receiver comprises a processor and a memory, communicatively coupled to the processor, wherein the memory stores processor-executable instructions, which, on execution, causes the processor to transform received signal in to frequency domain using a Discrete Fourier Transform (DFT) to generate transformed signal. Also, the processor equalizes the transformed signal to obtain estimated precoded signal and perform inverse Fourier transform operation on the estimated precoded signal to obtain time domain signal. Further, the processor de-rotates the time domain signal to produce de-rotated data and processes the de-rotated signal by separating real part and imaginary part associated with the de-rotated signal. The real part is filtered using a first filter and the imaginary parts is filtered using a second filter and the filter outputs are combined to produce a signal that is used for demodulation. In an embodiment, where the precoder is a two-tap filter and the first filter are absent, then the second filter takes the form of a circular shift followed by a scaling factor.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which:

DETAILED DESCRIPTION

Figure 1:
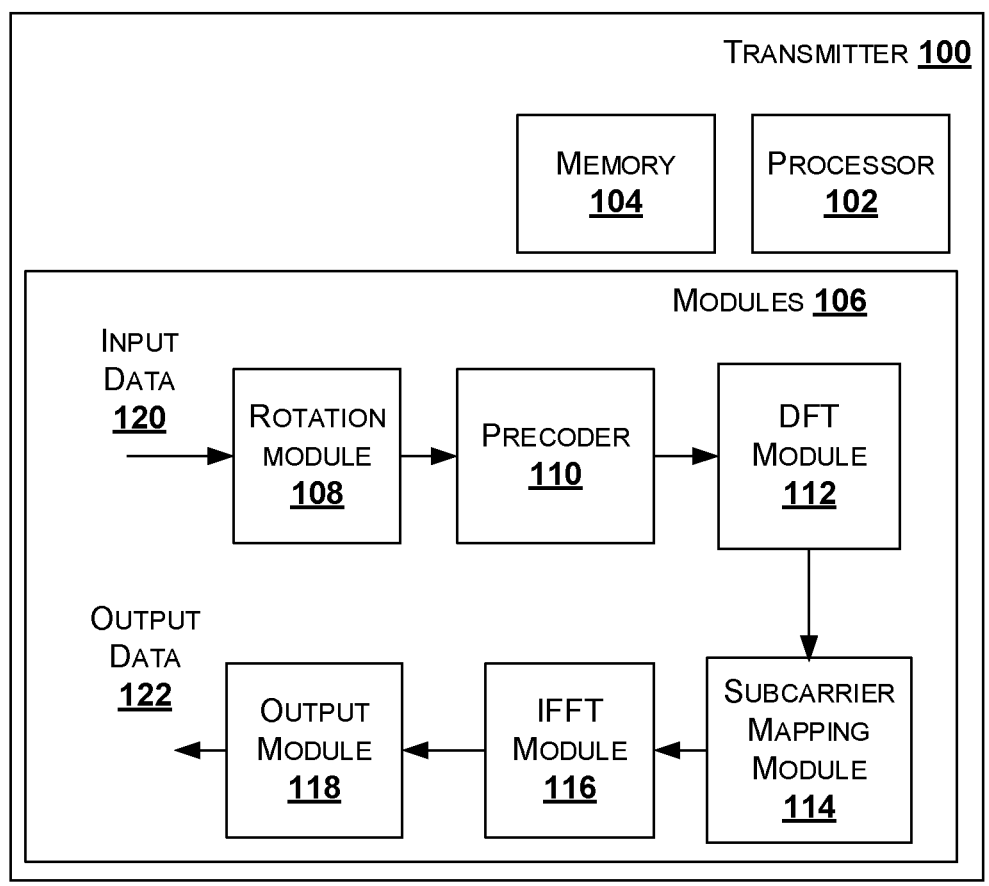
FIG. 1 shows a block diagram of a transmitter for transmitting a pi/2 Binary Phase Shift Keying (BPSK) sequence.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

Embodiments of the present disclosure relate to a communication receiver for pi/2BPSK Discrete Fourier Transform-spread-Orthogonal frequency-division multiplexing (DFT-s-OFDM) with pre-coding. In one embodiment, the precoder is 1+D or 1−D precoding. Another embodiment, the receiver uses a 2-tap filter with unequal values 1-qD precoding.

FIG. 1 shows a block diagram of a transmitter for transmitting a pi/2 Binary Phase Shift Keying (BPSK) sequence, in accordance with an embodiment of the present disclosure.

As shown in FIG. 1, the transmitter 100, also referred as a communication system or transmitting system includes a processor 102, memory 104, and modules 106. The memory 104 may be communicatively coupled to the processor 102. The processor 102 may be configured to perform one or more functions of the transmitter 100 for transmitting data. In one implementation, the transmitter 100 may comprise modules 106 for performing various operations in accordance with the embodiments of the present disclosure.

The transmitter 100 is a baseband portion of a pi/2 BPSK transmitter comprising a 1+D or 1−D precoder or shaping. 1+D precoder case uses one-sided DFT and 1−D precoder uses two-sided DFT. The operation performed by 1+D or 1−D precoder/shaping is equivalent to frequency domain pulse shaping without excess bandwidth (BW). The precoder uses a two-tap filter, with equal gain in an embodiment of the present disclosure. In an embodiment, the precoder may be one of $sD^{-1}+1+sD$ and $-sD^{-1}+1-sD$. In one embodiment another precoder equal to $0.26D^{-1}+1+0.26D$ or $-0.26D^{-1}+1-0.26D$ may be used.

The modules 106 includes a rotation module 108, precoder 110, a discrete Fourier transform (DFT) module 112, a subcarrier mapping module 114, an inverse fast Fourier transform (IFFT) module 116 and an output module 118.

The rotation module 108 receives and performs a constellation rotation operation on an input data 120. The rotation module 108 performs 90-degree rotation between successive data symbols or alternatively $j^k$ rotation where j is defined as square root of −1 and k is a discrete-time index on the input data 120, which is Binary Phase-shift keying (BPSK) data to generate a rotated data. Also, the rotation module 108 performs 90-degree constellation rotation which may be clock-wise or anti-clock wise. The rotation module 108 performs a pi/2 constellation rotation and 1+D or 1−D shaping is implemented using a look table by observing two consecutive input bits and mapping it to a QPSK constellation.

In an example embodiment, the precoded QPSK output may be written as: $c(n)=j^n(a(n)-ja(n-1))$ where $a(n)=a(M+n)$ is the BPSK modulated input sequence that has circularly symmetry, and j denotes sqrt (−1) and n=0, 1, . . . , M−1 is the discrete time index. The operation is illustrated for the case of $j^n$, where n=0, 1, . . . , M−1. The constellation mapping can be represented alternatively as $c(n)=j^{-n}(a(n)+ja(n-1))$.

In another example embodiment that uses 1+q D or 1−qD precoder where q takes values less than or equal to 1, considering rotation operation for case of $j^n$ where n=0, 1, . . . , M−1, then the constellation rotation mapping may be represented alternatively as $c(n)=j^n(a(n)+jq\,a(n-1))$. The rotated data is fed to the precoder 110 for pre-coding the rotated data.

In an embodiment, the rotation module 108 having pi/2 constellation rotation and precoder 110 with 1+qD shaping may be implemented using a look table by observing two consecutive input bits and mapping it to a QPSK constellation with possibly unequal real/imaginary parts. For example, the precoded QPSK output i.e. output of precoder 110 is $$c(n)=j^n(a(n)-jqa(n-1))$$

where $a(n)=a(M+n)$ is the BPSK modulated input sequence that has circularly symmetry, and j denotes sqrt (−1) and n=0, 1, . . . , M−1 is discrete time index.

The precoder 110 is configured with 1+qD precoder/shaping where 'q' is a real or complex-valued parameter, for precoding the rotated data to generate a precoded data. When the magnitude of q is less than 1, then there exists a range of values for which the precoded data or signal exhibits low PAPR, which may be used to drive a power amplifier (PA) near saturation and achieve adjacent channel leakage ratio (ACLR) requirements. In an embodiment 'q' values may be one of [+1, −1, +0.9, −0.9, +0.8, −0.8, +0.2, −0.2], less than +1 and the like. The precoding operation is equivalent to frequency domain pulse shaping without excess bandwidth (BW). The precoder 110 uses a two-tap filter, which may have equal or unequal gain. In another embodiment, other types of precoders that reduce the peak-to-average-ratio (PAPR) may also be used by the transmitter 100. For example, the precoder 110 may be configured with a 3-tap filter: $sD^{-1}+1+sD$, where s takes a range of values [0.26, 0.23, 0.3] and the like.

The DFT module 112 is configured to receive and transform the precoded data to generate DFT data. The subcarrier mapping block 114 performs subcarrier mapping on the DFT data. The IFFT module 116, also referred as inverse DFT module, performs the inverse transform of the mapped DFT data with a subcarrier mapping to generate a time domain signal. The output module 118 performs at least one of addition of cyclic prefix, cyclic suffix, windowing, windowing with overlap and adding operation (WOLA) and filtering of the time domain signal to generate output data 122, also referred as output sequence or waveform.

In an embodiment, the output data 122 may be fed to a digital to analog converter (DAC) to generate an analog waveform. A frequency shift may be added to the output data 122 or converted analog signal before transmission by the transmitter 100.

In one embodiment, the transmitter 100 in case of long term evolution (LTE) uses a single slot, which comprises twelve subcarriers and seven OFDM symbols. For data channels, one out of seven OFDM symbols is reserved for reference symbols/pilots that are used for channel estimation. For control channels, one resource block (RB) uses multiple OFDM symbols for reference symbols (RS). The pilots may be at least one of Zadoff-Chu (ZC) sequences and pi/2 BPSK modulated sequences.

In one embodiment, the transmitter's Peak-to-Average Power Ratio (PAPR) results show that pi/2 BPSK with 1+D or 1−D precoder/shaping has nearly 2.0 dB PAPR (at 99% cdf point) and QPSK (as in LTE) has 7.5 dB PAPR.

In one embodiment, long term evolution (LTE) uses a single slot, which comprises twelve subcarriers and seven OFDM symbols. For data channels, one out of seven OFDM symbols is reserved for reference symbols/pilots that are used for channel estimation. For control channels, one RB uses multiple OFDM symbols for reference symbols (RS). The pilots may be at least one of Zadoff-Chu (ZC) sequences and BPSK modulated sequences.

In one embodiment of the present disclosure, a receiver uses ZC reference signal for estimating the propagation channel and applies precoding of at least one of 1+D and other precoder used by the transmitter. The receiver comprises a precoder to perform precoding/shaping on the estimated channel to reconstruct the effective channel experienced by the pi/2 BPSK data symbols. This can be accomplished in time or frequency domain.

Figure 2A:
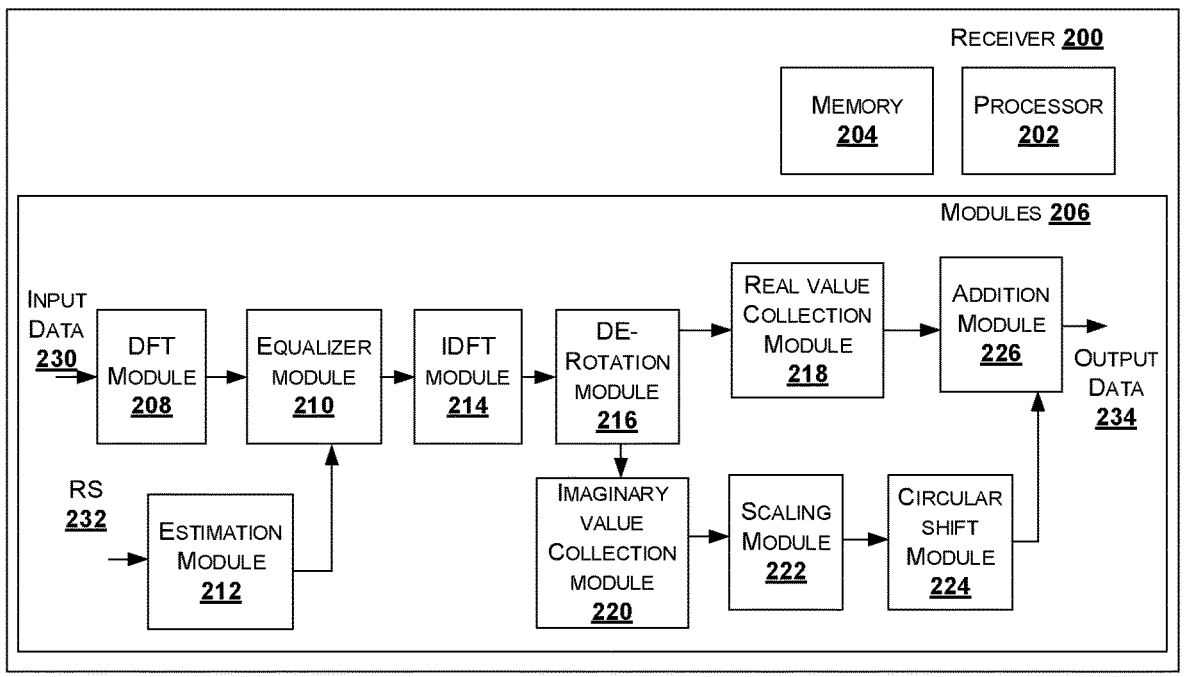
FIG. 2A shows an exemplary block diagram of a receiver for receiving a waveform using Pi/2 BPSK with precoding, in accordance with an embodiment of the present disclosure.

FIG. 2A shows an exemplary block diagram of a receiver for receiving a waveform using Pi/2 BPSK with 1+qD or 1−qD precoding where the value of q may be less than or equal to 1, in accordance with an embodiment of the present disclosure.

As shown in FIG. 2A, the receiver 200, also referred as a communication system or receiver system, includes the processor 202, and the memory 204. The memory 204 may be communicatively coupled to the processor 202. The processor 202 may be configured to perform one or more functions of the communication system 200 for receiving data. In one implementation, the communication system 200 may comprise modules 206 for performing various operations in accordance with the embodiments of the present disclosure. The receiver receives the communication data i.e. input data 230 from at least one transmitter. In the baseband portion, for the receiver, the modules such as, but not limited to, carrier down conversion, analog to digital conversion are not shown. The receiver carries standard operations like cyclic prefix removal, FFT, subcarrier de-mapping, which is not shown in FIG. 2A. After subcarrier de-mapping, the receiver collects M-samples and taken a DFT for further equalization.

The modules 206 includes a a discrete Fourier Transform (DFT) module 208, an equalizer module 210, an estimation module 212, an inverse DFT (IDFT) module 214, a de-rotation module 216, a real value collection module 218, an imaginary value collection module 220, a scaling module 222 that scales the imaginary value by either q or −q, a circular shift module 224, and an addition module 226. The receiver 200 receives the communication data or waveform i.e. an input data 230 from at least one transmitter. In the baseband portion, for the receiver, the modules such as, but not limited to, carrier down conversion, analog to digital conversion are not shown. The receiver carries standard operations like cyclic prefix removal, FFT, subcarrier de-mapping. After subcarrier de-mapping, the receiver collects M-samples and taken a DFT for further equalization.

The DFT module 208 transforms the input data 230 from the time domain in to frequency domain, to generate transformed data. The equalizer module 210 is a Nr branch equalizer, which performs equalization of transformed data to generate equalized data. The equalizer module 210 comprises Nr-receiver antennas, the receiver has 2Nr copies of the signal. Further, the equalizer module 210 receives an input from the estimation module 212, which is also referred as a channel estimation module. The estimation module 212 performs estimation of channel through which the receiver 200 receives the input data 230. After performing the channel estimation, the equalizer module 210 performs equalization of transformed data using the channel estimated data. That is the 2Nr branch linear minimum mean square estimation (MMSE) receiver is applied in frequency domain followed by IDFT, which is performed using IDFT module 214. A soft demodulator (not shown in FIG. 2A) feeds the soft decision to de-interleaver/decoder.

The channel estimation module 212 uses reference signal such as ZC sequence or pi/2 BPSK sequence for estimating the propagation channel and applies precoding of at least one of 1+D and other precoder used by the transmitter. In one embodiment for channel estimation, the DFT outputs of ZC/binary reference signal is used to remove the modulation on the subcarriers i.e. conjugate multiplication of ZC sequence/division by pilot modulation, to obtain modulation free pilots that are used for estimating the propagation channel.

In another embodiment for channel estimation, a frequency domain channel estimation which involves frequency domain interpolation of modulation free pilots is used. the method used is to average the modulation free pilots over a certain frequency window to obtain a single channel estimate for all subcarriers contained in that window. The frequency window operation reduces the noise/interference contained in the pilots/reference symbols.

Figure 2B:
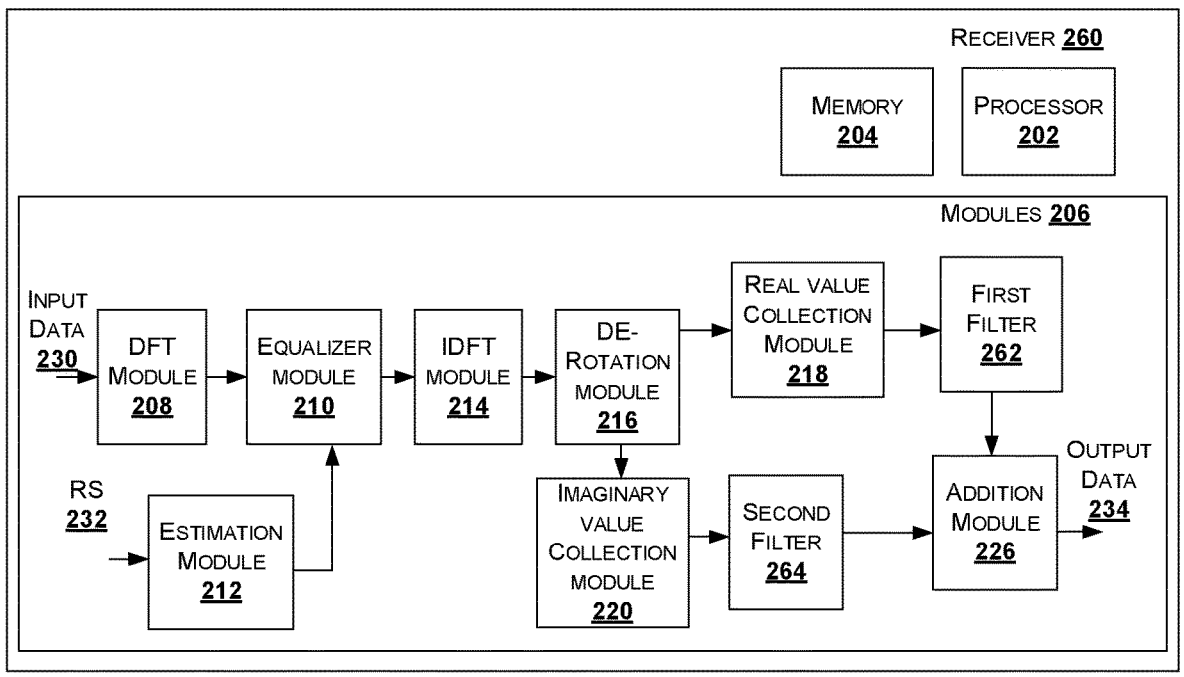
FIG. 2B shows another block diagram of a receiver for receiving a waveform using Pi/2 BPSK with precoding, in accordance with another embodiment of the present disclosure.

FIG. 2B shows a block diagram of a receiver for receiving a waveform using Pi/2 BPSK with precoder that takes more 2 or more taps (for example, a 3-tap filter: $sD^{-1}+1+sD$, where s takes a range of values [0.26, 0.23, 0.3]), in accordance with another embodiment of the present disclosure. In this case, the first stage of the receiver applies an equalizer to generate an estimate of the precoded data and second stage applies a first filter on the real of part of the de-rotated data and second filter on the imaginary part of the de-rotated data before the filter out puts are combined for demodulation. The first and second filter are determined using MMSE-type approach to equalizer the ISI caused by the precoder.

As shown in FIG. 2B, the receiver 260, also referred as a communication system or receiver system, includes the processor 202, and the memory 204. The memory 204 may be communicatively coupled to the processor 202. The processor 202 may be configured to perform one or more functions of the communication system 200 for receiving data. In one implementation, the communication system 200 may comprise modules 206 for performing various operations in accordance with the embodiments of the present disclosure. The receiver receives the communication data i.e. input data 230 from at least one transmitter. In the baseband portion, for the receiver, the modules such as, but not limited to, carrier down conversion, analog to digital conversion are not shown. The receiver carries standard operations like cyclic prefix removal, FFT, subcarrier de-mapping, which is not shown in FIG. 2B. After subcarrier de-mapping, the receiver collects M-samples and taken a DFT for further equalization.

The modules 206 includes a a discrete Fourier Transform (DFT) module 208, an equalizer module 210, an estimation module 212, an inverse DFT (IDFT) module 214, a de-rotation module 216, a real value collection module 218, an imaginary value collection module 220, a first filter 262, a second filter 264 and an addition module 226. The receiver 260 receives the communication data or waveform i.e. an input data 230 from at least one transmitter. In the baseband portion, for the receiver, the modules such as, but not limited to, carrier down conversion, analog to digital conversion are not shown.

The DFT module 208 transforms the input data 230 from the time domain in to frequency domain, to generate transformed data. The equalizer module 210 performs equalization of transformed data to generate equalized data. Also, the equalizer module 210 receives an input from the estimation module 212, which is also referred as a channel estimation module. The estimation module 212 performs estimation of channel through which the receiver 200 receives the input data 230. After performing the channel estimation, the equalizer module 210 performs equalization of transformed data using the channel estimated data. After, equalization inverse DFT is performed using IDFT module 214.

The first filter 262 receives the de-rotated real part signal from the real value collection module 218, to estimate the received signal by filtering the real part of the de-rotated signal to reduce the ISI caused by the precoder on the real-branch. The filtered de-rotated real part is sent to the addition module 226. The second filter 264 receives the de-rotated imaginary part from the imaginary value collection module 220. The second filter filters the ISI caused by the precoder on the imaginary branch.

The addition module 226, also referred as a combiner module, combines the output of the first filter and second filter obtain a soft output. The soft output is demodulated and processed to obtain the BPSK data i.e. the received data, in an embodiment.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description. Accordingly, the disclosure of the embodiments of the invention is intended to be illustrative, but not limiting, of the scope of the invention.

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A method of detecting data in a communication network, the method comprising:
   transforming, by a receiver, a received signal in to frequency domain using a Discrete Fourier Transform (DFT) to generate a transformed signal;
   equalizing, by the receiver, the transformed signal to obtain an estimated precoded signal;
   performing inverse Fourier transform operation, by the receiver, on the estimated precoded signal to obtain a time domain signal;
   de-rotating, by the receiver, the time domain signal to produce a de-rotated data; and
   processing the de-rotated signal, by the receiver, by separating real part and imaginary part associated with the de-rotated signal to generate a soft output signal wherein processing the de-rotated signal by separating real part and imaginary part associated with the de-rotated signal comprises:
   estimating the received signal using the real part of the de-rotated signal, wherein the estimated received signal is a constellation rotated received signal;
   scaling the imaginary part signal of the de-rotated signal and circularly shifting the scaled signal to obtain a circularly shifted received signal; and
   generating a soft output signal by combining the estimated received signal and circularly shifted received signal.

2. The method as claimed in claim 1, wherein the received signal is a binary phase shift keying (BPSK) signal.

3. The method as claimed in claim 1, wherein the received signal is a pi/2 constellation rotated BPSK signal, which the receiver processes as a QPSK signal.

4. The method as claimed in claim 1, wherein the received signal is precoded with one of 1+qD precoder, 1−qD precoder, $sD^{-1}+1+sD$ precoder and $-sD^{-1}+1-sD$ precoder, wherein said D is a delay unit.

5. The method as claimed in claim 4, wherein the s is a constant variable with a value equal to one of 0.26, 0.23, 0.3 and less than 1, and q is a constant variable with a value less than or equal to 1.

6. The method as claimed in claim 1, wherein the equalizing the transformed signal is performed using one of minimum mean square estimation (MMSE) and zero forcing equalizer.

7. The method as claimed in claim 1, wherein de-rotating of the time domain signal is a constellation de-rotation.

8. The method as claimed in claim 1, wherein processing the de-rotated signal comprising:
   separating real part and imaginary part of the de-rotated signal;
   estimating the received signal by filtering the real part of the de-rotated signal filtering the de-rotated imaginary part; and
   generating a soft output signal by combining the estimated received signal and unbias received signal.

9. A receiver for receiving data in a communication network, the receiver comprising:
   a processor; and
   a memory, communicatively coupled to the processor, wherein the memory stores processor-executable instructions, which, on execution, causes the processor to:
   transform a received signal in to frequency domain using a Discrete Fourier Transform (DFT) to generate a transformed signal;
   equalize the transformed signal to obtain an estimated precoded signal;
   perform inverse Fourier transform operation on the estimated precoded signal to obtain a time domain signal;
   de-rotate the time domain signal to produce a de-rotated data; and
   process the de-rotated signal, by the receiver, by separating real part and imaginary part associated with the de-rotated signal to generate a soft output signal wherein processing the de-rotated signal by separating real part and imaginary part associated with the de-rotated signal comprising:
   estimating the received signal using the real part of the de-rotated signal, wherein the estimated received signal is a constellation rotated received signal;
   scaling the imaginary part signal of the de-rotated signal and circularly shifting the scaled signal to obtain a circularly shifted received signal; and
   generating a soft output signal by combining the estimated received signal and circularly shifted received signal.

10. The receiver as claimed in claim 9, wherein the received signal is a binary phase shift keying (BPSK) signal.

11. The receiver as claimed in claim 9, wherein the received signal is a pi/2 constellation rotated BPSK signal, which the receiver processes as a QPSK signal.

12. The receiver as claimed in claim 9, wherein the received signal is precoded with one of 1+qD precoder, 1−qD precoder, $sD^{-1}+1+sD$ precoder and $-sD^{-1}+1-sD$ precoder, wherein said D is a delay unit.

13. The receiver as claimed in claim 12, wherein the s is a constant variable with a value equal to one of 0.26, 0.23, 0.3 and less than 1, and q is a constant variable with a value less than or equal to 1.

14. The receiver as claimed in claim 9, wherein the equalizing the transformed signal is performed by an equalizer module using one of minimum mean square estimation (MMSE) and zero forcing equalizer.

15. The receiver as claimed in claim 9, wherein de-rotating of the time domain signal is performed by a de-rotating module, which is a constellation de-rotation.

16. The receiver as claimed in claim 9, wherein processing the de-rotated signal comprising:
   separating real part and imaginary part of the de-rotated signal;
   estimating the received signal by filtering the real part of the de-rotated signal filtering the de-rotated imaginary part; and
   generating a soft output signal by combining the estimated received signal and unbias received signal.

* * * * *

UNITED STATES PATENT AND TRADEMARK OFFICE
CERTIFICATE OF CORRECTION

PATENT NO. : 10,848,360 B1  
APPLICATION NO. : 16/509468  
DATED : November 24, 2020  
INVENTOR(S) : Kiran Kumar Kuchi Page 1 of 1

It is certified that error appears in the above-identified patent and that said Letters Patent is hereby corrected as shown below:

In the Specification

Column 1 after "of" in Line 12, Please add:
--Related U.S. Application: Continuation of PCT/IB2018/050191 filed January 12, 2018--

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*